United States Patent [19]

Emmert

[11] 3,731,170

[45] May 1, 1973

[54] CIRCUIT FOR CONTROLLING THE DIRECTION OF CURRENT FLOW IN A LOAD IMPEDANCE

[75] Inventor: Reinhold Emmert, D-8510 Fuerth, Germany

[73] Assignee: Grundig EMV, Furth Bay Kurgartenstrasse, Germany

[22] Filed: June 19, 1972

[21] Appl. No.: 264,029

[30] Foreign Application Priority Data

June 22, 1971 Germany.....................P 21 30 847.4

[52] U.S. Cl. ...................318/257, 318/293, 318/332

[51] Int. Cl. ................................................H02p 5/16

[58] Field of Search......................318/257, 293, 322, 318/681

[56] References Cited

UNITED STATES PATENTS

| | | | |
|---|---|---|---|
| 2,976,469 | 3/1961 | Christiano | 318/293 |
| 3,032,697 | 5/1962 | Kirk | 318/293 |
| 3,568,024 | 3/1971 | Robbins | 318/293 |

*Primary Examiner*—Bernard A. Gilheany
*Assistant Examiner*—Thomas Langer
*Attorney*—Lewis H. Eslinger et al.

[57] ABSTRACT

One terminal of a load impedance is connected to the collectors of two transistors of opposite conductivity type. Their emitters are connected to positive and negative power supply terminals to receive direct current, and the emitter-collector circuits of the two transistors are in current-carrying polarity with respect to the direct current terminals. The bases of the two transistors are connected to the arm of a single-pole-double-throw switch. The fixed contacts of the switch are connected to the positive and negative power supply terminals so that in one position the base of one transistor is biased to conductivity to allow current to flow in one direction through the load impedance and the conductive transistor. When the switch is in the opposite position the other transistor is conductive and current can flow in the opposite direction through the latter transistor and the load impedance.

5 Claims, 2 Drawing Figures

CIRCUIT FOR CONTROLLING THE DIRECTION OF CURRENT FLOW IN A LOAD IMPEDANCE

BACKGROUND OF THE INVENTION

1. Field Of The Invention

This invention relates to the field of simplified switching means for controlling the direction of a flow of direct current through a load impedance and in particular for controlling the direction of current flowing through a direct current motor.

2. The Prior Art

When direct current through a load impedance is derived from a source having only a positive and negative terminal, reversal of the direction of current flow through the impedance has heretofore required the use of a double-pole-double-throw switch, or switching circuit. Such a switch or switching circuit is relatively complex and expensive and is therefore undesirable in apparatus of the type in which it is important to keep the cost and complexity as low as possible.

The direction of current flow through a load impedance can be controlled by a single-pole-double-throw switch if the current source has a center tap to which one end of the impedance is connected. If the other end of the impedance is then connected to the arm of the single-pole-double-throw switch and the contacts of the switch are connected to the positive and negative terminals of the power supply, current can be caused to flow through the impedance in one direction or the other merely by moving the switch to either of its two positions. However for a given current level the equivalent of two sources is required. This can be just as complex and undesirable as the use of a double-pole-double-throw switch.

It is one of the objects of the present invention to provide a simple circuit in which the direction of current flow through a load impedance can be controlled by means of a single-pole-double-throw switch or the equivalent.

A further object is to provide a simple circuit for operating a direct current motor in either direction by causing current to flow through it in the appropriate direction in response to operation of a single-pole-double-throw switch or the equivalent.

A still further object is to provide a simplified current reversal circuit for controlling a direct current motor and for controlling the speed of the motor in one direction.

Further objects will be apparent from the following specification together with the drawings.

BRIEF DESCRIPTION OF THE INVENTION

In accordance with the present invention one terminal of a load impedance is connected to the arm of a single-pole-double-throw switch or switching circuit. The two fixed contacts of the switch are connected, respectively, to the positive and negative power supply terminals. The other terminal of the load impedance is connected to an intermediate terminal of a series circuit that comprises the emitter-collector circuits of two transistors of opposite conductivity type. This series circuit is connected in current-carrying polarity between the positive and negative terminals of the power supply and is arranged so that the collectors of the two transistors are connected to the intermediate terminal and the emitters are connected to the positive and negative power supply terminals. The bases of the two transistors are connected to the arm of the switch so that when the arm is moved into contact with one of the fixed contacts one of the transistors will be biased to be conductive and the other will be biased to be non-conductive. This allows current to flow from the positive power supply terminals through the impedance in one direction and through the conductive transistor to the negative power supply terminal. When the arm of the switch is moved into contact with the other fixed contact, the other transistor is biased to be conductive and the previously conductive transistor is biased to be non-conductive. In that case current can flow from the positive power supply terminal through the conductive transistor and through the impedance in the opposite direction to the negative power supply terminal.

DETAILED DESCRIPTION OF THE INVENTION

Figure 1:
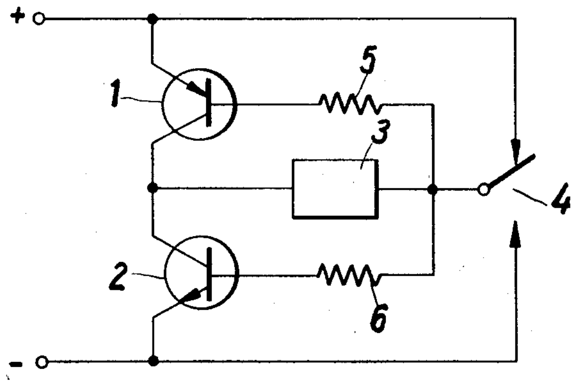
FIG. 1 is a simplified circuit diagram of one embodiment of the invention.

The embodiment of the invention depicted in FIG. 1 includes two transistors 1 and 2 of opposite conductivity types. The emitter of the transistor 1 is connected to the positive terminal of the circuit and the emitter of the transistor 2 is connected to the negative terminal of the circuit so that when a direct current source is connected between these terminals in the corresponding polarity, the emitter-collector circuits of the two transistors 1 and 2 are connected in current-carrying polarity between the positive and negative terminals, although, as will be described hereinafter, only one of these transistors is conductive at a time.

The collectors of the two transistors 1 and 2 are connected together to an intermediate terminal which is also connected to one terminal of a load impedance 3. The other terminal of the load impedance is connected to the arm of a single-pole-double-throw switch 4. One of the fixed contacts of the switch 4 is connected to the positive terminal of the circuit and to the emitter of the transistor 1 while the other fixed contact of the switch 4 is connected to the emitter of the transistor 2 and to the negative terminal of the circuit. A first current limiting resistor 5 connects the base of the transistor 1 to the second terminal of the impedance 3 and to the arm of the switch 4. Another current limiting resistor 6 connects the base of the transistor 2 to the same common connection between the impedance 3 and the arm of the switch 4.

When a voltage source is connected to the power supply terminals of the circuit with the indicated polarity and when the arm of the switch 4 is in the position shown, the base of the transistor 1 is essentially connected to the emitter of the same transistor and therefore this transistor is non-conductive. At the same time the base of the transistor 2 is connected to the positive terminal, which biases the transistor 2 to conductivity. As a result current can flow from the positive terminal of the circuit through the arm of the switch 4 and, in one direction, through the impedance 3 and the emitter-collector circuit of the transistor 2 to the negative power supply terminal.

When the position of the arm of the switch 4 is reversed, the base of the transistor 2 is essentially connected to the emitter of that transistor and the transistor 2 is thus made non-conductive. However, the base of the transistor 1 is connected to the negative terminal so that the transistor 1 is biased to be conductive. This allows current to flow from the positive terminal of the circuit through the emitter-collector circuit of the transistor 1 and, in the opposite direction from that previously described, through the impedance 3 and the arm of the switch 4 to the negative terminal.

Thus the direction of current flow through the impedance 3 is controlled by a single-pole-double-throw switch even though the power supply only has two terminals, one positive and the other negative. While the switch 4 is indicated in mechanical form it is obvious that a circuit equivalent thereto could be used.

Figure 2:
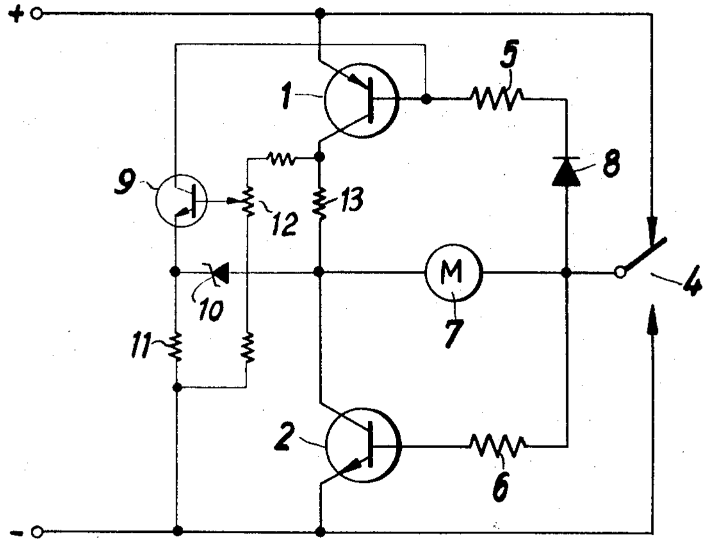
FIG. 2 is a circuit diagram of a modification of the circuit in FIG. 1 to include a speed control circuit along with the polarity reversal circuit for controlling a direct current motor.

FIG. 2 shows a modified circuit that not only includes means for controlling the direction of current flow through a motor 7 but also means for controlling the speed of the motor. This is particularly useful for portable tape recorders and the like. In the circuit the motor 7 takes the place of the impedance 3 in FIG. 1 and is connected to an intermediate terminal between the collectors of the transistors 1 and 2. A diode 8 is connected in series with the current limiting resistor 5 between the arm of the switch 4 and the base of the transistor 1 to obtain correct base voltage for this transistor. The part of the circuit that controls the speed includes an auxiliary transistor 9 having its collector connected to the base of the transistor 1, a zener diode 10 connected between the motor 7 and the emitter of the transistor 9, and a resistor 11 between the emitter of the transistor 9 and the negative power supply terminal. The speed control circuit also includes a voltage divider comprising a potentiometer 12 the arm of which is connected to the base of the transistor 9, and a resistor 13 connected in series between the collector of the transistor 1 and the common junction between the motor 7 and the collector of the transistor 2.

In operation, when the switch 4 is in the position shown, current flows through the transistor 2 and through the motor 7 in such a way as to cause the motor to run backward, as required for rewinding tape, for example. There is no need to be concerned about the speed of the motor during such operation, and the circuit does not include means to govern the speed during reverse operation.

However, when the motor is to be operated in the forward direction, as in the case of recording information on tape or playing it back, controlled speed is important. Forward movement is obtained by moving the switch 4 to the opposite position from that shown in FIG. 2, which causes current to flow through the transistor 1 and the motor 7 in the proper direction to cause the motor 7 to run in the forward direction. This current also flows through the resistor 13 and produces a voltage drop thereacross. If the supply voltage drops, the voltage across the motor will also drop. Due to the fact that the zener diode 10 has a constant voltage drop across it, the voltage at the emitter of the transistor 9 will drop by substantially the same amount, and the voltage across the resistor 11 will also drop, causing the voltage at the emitter of the transistor 9 to be more negative relative to its base electrode. As a result, the collector current of the transistor 9 will be increased and will cause an increase in the collector current of the transistor 1 due to the connection between the collector of the transistor 9 and the base of the transistor 1. This increased current through the transistor 1 will flow through the motor 7 and cause the speed of the motor to increase back to the predetermined level.

If, on the other hand, the load applied to the motor 7 increases causing the motor to tend to rotate more slowly, the current through the motor will also increase, producing a higher voltage drop across the resistor 13. As a result, the voltage across the voltage divider that includes the potentiometer 12 will also increase and will cause an increase in the voltage applied to the base of the transistor 9. This, in turn, causes an increase in collector current of the transistor 9, which causes an increase in the collector current of the transistor 1 and again brings the speed of the motor 7 back up to the predetermined level. An increase in the applied voltage or a decrease in the load on the motor, either of which would tend to make the motor 7 run faster, will produce an opposite speed-controlling effect, causing the motor 7 always to tend to run at a substantially constant speed in the forward direction.

What is claimed is:

1. A switching circuit comprising:

A. positive and negative direct current supply terminals;

B. first and second transistors of opposite conductivity type, the emitters of each of said transistors being connected to a respective one of said terminals and the collectors of said transistors being connected to an intermediate terminal, whereby the emitter-collector circuits of said transistors and said intermediate terminal comprise a series circuit connected in current-carrying polarity between said positive and negative terminals; contact means C. single-pole-double-throw switching means comprising:

1. first and second fixed contact means connected to said positive and negative terminals, respectively, and
2. a movable contact means connected to the bases of said transistors to connect said bases, selectively, to said positive or negative terminal to cause a selected one of said transistors to become conductive, whereby said conductive transistor forms a low impedance path between said intermediate terminal and the supply terminal to which said conductive transistor is connected, and a load impedance connected in series between said intermediate terminal and said movable contact means of said switching means.

2. The switching circuit of claim 1 in which said switching means comprises a mechanical switch.

3. The switching circuit of claim 1 in which said load impedance comprises a direct current motor.

4. The switching circuit of claim 4 comprising, in addition, a speed control circuit comprising current controlling means connected between said first transistor and said intermediate terminal to control the emitter current of said first transistor and thereby control the speed of said motor running in the forward direction.

5. The switching circuit of claim 5 in which said speed control circuit comprises:

A. a resistor connected in series between said collector of said first transistor and said intermediate terminal;

B. a constant voltage device connected to said intermediate terminal; and

C. a third transistor having:

1. a base connected to said resistor to be controlled by the voltage thereacross,
2. an emitter connected to said constant voltage device to be kept at a voltage different by a constant value from the voltage at said intermediate terminal, and
3. a collector connected to the base of said first transistor to control the operation thereof to stabilize the speed of said motor.

* * * * *